Feb. 16, 1932.  A. J. SORENSEN  1,845,451
ELECTRICAL APPARATUS
Filed Jan. 25, 1930

INVENTOR:
A. J. Sorensen,
by A. R. Vencill
His Attorney

Patented Feb. 16, 1932

1,845,451

UNITED STATES PATENT OFFICE

ANDREW J. SORENSEN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL APPARATUS

Application filed January 25, 1930. Serial No. 423,412.

My invention relates to electrical apparatus, and particularly to apparatus of the type involving a source of alternating current, a rectifier receiving current from such source, and a direct current load supplied by the rectifier.

I will describe two forms of apparatus embodying my invention, and will then point out the novel features thereof in claim.

Figure 1:
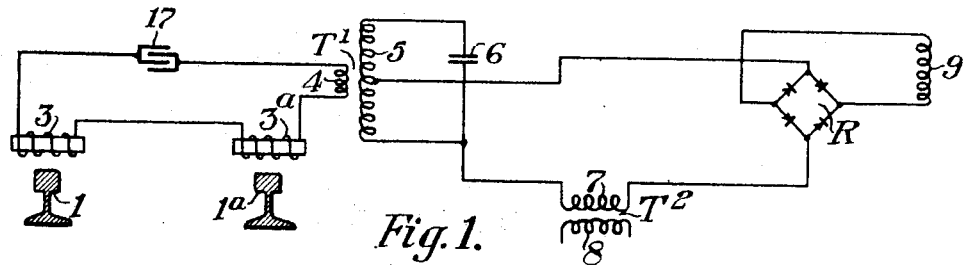
Figure 2:
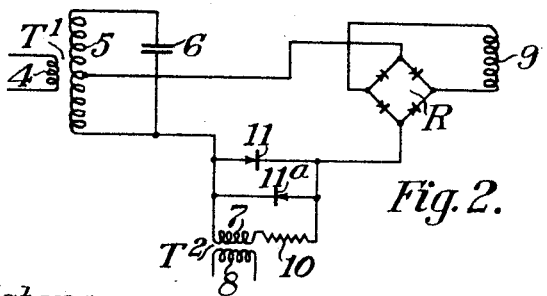
Figure 3:
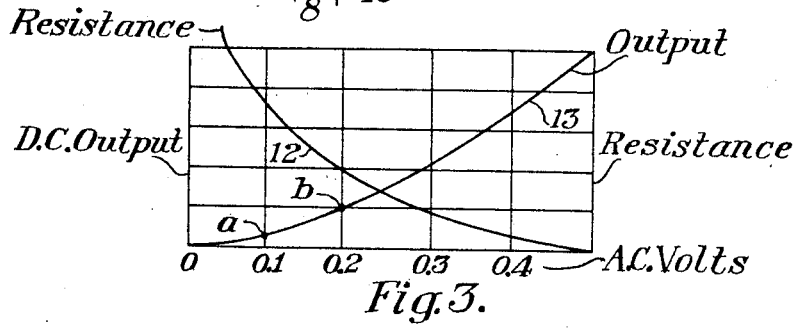
Figure 4:
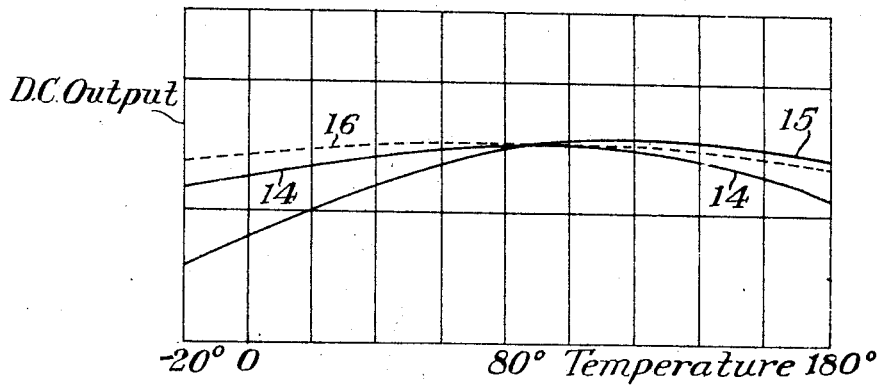

In the accompanying drawings, Fig. 1 is a diagrammatic view showing one form of apparatus embodying my invention. Fig. 2 is a view similar to Fig. 1, but showing a modification of a portion of the apparatus therein and also embodying my invention. Figs. 3 and 4 are curves illustrating the characteristics of the apparatus shown in Figs. 1 and 2, respectively.

Similar reference characters refer to similar parts in each of the views.

Referring first to Fig. 1, the reference character $T^1$ designates a transformer, the primary 4 of which is connected with a source of alternating current of relatively low voltage. For example, as shown in the drawings, the primary 4 may be included in the train-carried receiving circuit of a continuous inductive train control system. This circuit includes windings 3 and $3^a$ connected in series, and located in inductive relation to track rails 1 and $1^a$, respectively, whereby when alternating current is flowing in these rails an alternating current of very low voltage in induced in the windings and 3 and $3^a$. This circuit is usually tuned by a condenser 17. The secondary 5 of transformer $T^1$ is connected with a condenser 6 for tuning and filtering purposes, and this secondary is also provided with a tap so that a suitable voltage can be impressed upon the input terminals of a full-wave rectifier R. This rectifier is of the copper oxide type and is therefore characterized by the fact that at low voltage values its resistance decreases sharply as the alternating input voltage increases. The output terminals of the rectifier R are connected with a load 9, which may, for example, be the input winding of a suitable amplifying device, such as a device of the magnetic type.

With apparatus of the character described, the alternating voltage impressed on the input terminal of the rectifier R is of the order of 0.1 of a volt, and, consequently, the resistance of the rectifier is very high. Furthermore, with input voltages of the order of 0.1 of a volt, the resistance of the rectifier will decrease very rapidly with an increase in the alternating input voltage. This characteristic is illustrated by curve 12 in Fig. 3. Another way of expressing the same thing, is to say that the direct current output of the rectifier increases rapidly with an increase of alternating input voltage, and this characteristic is illustrated by curve 13 in Fig. 3.

Considering the curve 13 in Fig. 3, it will be noted that if the input voltage is 0.1 of a volt, the direct current output will be represented by the value $a$, whereas if the input voltage is 0.2 of a volt, the direct current output will be represented by the value $b$. The value $b-a$ is obviously considerably greater than the value $a$, and, consequently, it follows that if the rectifier can be operated in the 0.1 of a volt range between points $a$ and $b$, the direct current output will be considerably increased. In order to do this, I have interposed in the input circuit of the rectifier R the secondary 7 of an auxiliary transformer $T^2$, the primary 8 of which is constantly supplied with alternating current, and the parts may be so proportioned that the voltage impressed on the input circuit by the transformer $T^2$ is 0.1 of a volt. This voltage need not be of the same frequency as that furnished by the transformer $T^1$. The total voltage on the rectifier R will now be roughly the sum of the two separate voltages, so that with no input voltage from the transformer $T^1$, a current corresponding to point $a$, on curve 13, will be delivered by the rectifier R. When, however, a voltage of 0.1 of a volt is impressed on the rectifier input circuit by transformer $T^1$, a current corresponding to point $b$, on curve 13, will be obtained in the output circuit of the rectifier. It will be obvious from curve 13 that the increase in direct current output from the rectifier R will be several times greater when the transformer $T^2$ is in the circuit than when it is not.

Apparatus embodying my invention is particularly useful in connection with code train control systems, that is, systems wherein current is periodically supplied to the transformer $T^1$ from the track rails. If no extra voltage is used in the rectifier circuit, the rectifier will have a relatively high resistance, whereas if the additional voltage is provided, the resistance of the rectifier will be materially reduced. Consequently, a considerably greater output can be obtained from the rectifier with the extra voltage than without it.

Referring now to Fig. 2, I have shown a modification of the apparatus shown in Fig. 1, which modification has the additional characteristic of counteracting the effect of temperature changes on the output of the rectifier. I have found that when a rectifier is operating on a very low voltage, the output varies considerably with variations in temperature. This is due to the rapid change in the rectifier resistance with changes in temperature. In Fig. 2, a resistance 10 is connected in series with the secondary 7 of transformer $T^2$, and two auxiliary half-way rectifiers 11 and $11^a$ are oppositely connected across that portion of the input circuit of rectifier R which includes the secondary 7 and the resistance 10. The resistances of the rectifiers 11 and $11^a$ should be of the same order of magnitude as that of the rectifier R, and the value of resistance 10 should be somewhat lower than that of the input amplifier winding 9.

To understand how the output regulation is obtained, it should be kept in mind that a rectifier circuit, such as that shown in Fig. 2, but without the elements 7, 10, 11 and $11^a$, can be so designed as to give the same output at two given temperatures. Thus referring to Fig. 4, the apparatus can be designed to give an output curve similar to curve 14, in which the direct current output is the same at $-20°$ as at $180°$, and has somewhat higher values at all intermediate temperatures. It can also be designed to give an output curve, such as that illustrated by curve 15, in which the output at $180°$ is only slightly lower than at $80°$, but decreases rapidly as the temperature assumes lower values. I will now assume that the apparatus has been so designed as to give the output represented by curve 15, and that the extra equipment comprising elements 7, 10, 11 and $11^a$ is then added. The effect of the extra voltage due to transformer $T^2$ under different temperature conditions, will be as follows: Considering first the high temperatures, the addition of the extra elements means an additional impedance in series with the transformer secondary 5 and rectifier R, but since resistance 10 has a smaller value than the resistance of the rectifier output circuit, and since moreover rectifiers 11 and $11^a$, which at this temperature have a very low resistance, offer a parallel path, the added impedance is small compared with the total impedance of the circuit. The current due to the voltage in secondary 7 flows partly through rectifiers 11 and $11^a$, and partly through the circuit including rectifier R and the filter tap. Since all the rectifiers have very low resistances at high temperature, it will be clear that a considerable part of the voltage due to transformer $T^2$ will be taken by resistance 10, so that the current from this source through rectifier R and secondary 5 will be of a much lower value than if the circuit shown in Fig. 1 were used. It will be seen, therefore, that the output of rectifier R will remain nearly the same after adding the extra elements as it was before.

Considering now the low temperature, that is, $-20°$; at this temperature the resistances of all of the rectifiers are many times higher than the resistance of element 10, and so almost the entire voltage of transformer secondary 7 is applied to the circuit containing rectifier R and secondary 5. Due to this voltage a considerable amount of current will flow through the input circuit, and the situation will be very much the same as that which exists with the apparatus shown in Fig. 1. At $-20°$, therefore, and at all other low temperatures, the output curve of rectifier R will be changed, so that it will be similar to the dotted curve 16 in Fig. 4.

To sum up the foregoing discussion, it will be apparent from a consideration of curves 14 and 16 in Fig. 4 that with the elements 7, 10, 11 and $11^a$ in the circuit, the effect of temperature variations on the output of rectifier R is materially less than without these elements. This result may be said to be obtained in two stages: First, by reducing the effective resistance of the rectifier R by applying an extra voltage to it, and second, by making such extra voltage poorly regulated so as to furnish different amounts of current to the rectifier at different temperatures.

Substantially the same results may be obtained by applying a voltage, either direct or alternating, to the output circuit of rectifier R, so as to cause current to flow in the low resistance direction through this rectifier. By this means the resistance of the rectifier is reduced so as to lessen its impedance to the alternating input current.

Although I have herein shown and described only two forms of apparatus embodying my invention, it is understood that various changes and modifications may be made therein within the scope of the appended claim without departing from the spirit and scope of my invention.

Having thus described my invention, what I claim is:

In combination, a main source of alternating current, a main rectifier having its input terminals connected with said source, a transformer having its secondary included in the input circuit of said rectifier and its primary supplied with current from an auxiliary source, a resistance in series with said secondary, and two auxiliary half-wave rectifiers oppositely connected across that portion of said input circuit which includes said secondary and said resistance.

In testimony whereof I affix my signature.

ANDREW J. SORENSEN.